INVENTORS
Morris F. Ketay
Joseph R. Miller
BY
Roy D. Bateman
ATTORNEY

Jan. 3, 1950 M. F. KETAY ET AL 2,493,585
ELECTRICAL FOLLOW-UP SYSTEM
Filed April 27, 1944 10 Sheets-Sheet 6

INVENTORS
Morris F. Ketay
BY Joseph R. Miller.
Roy D. Bateman
ATTORNEY

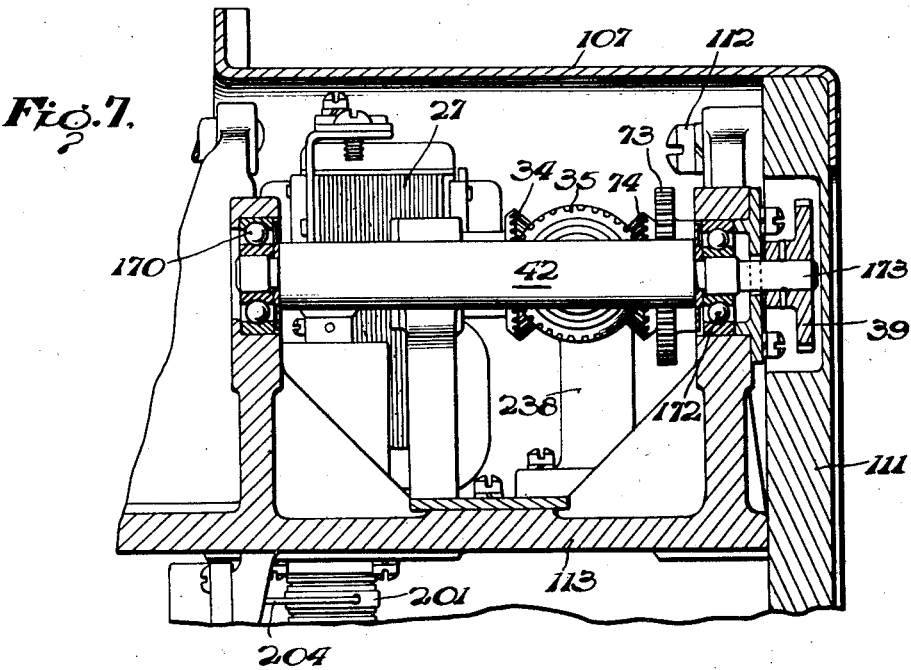
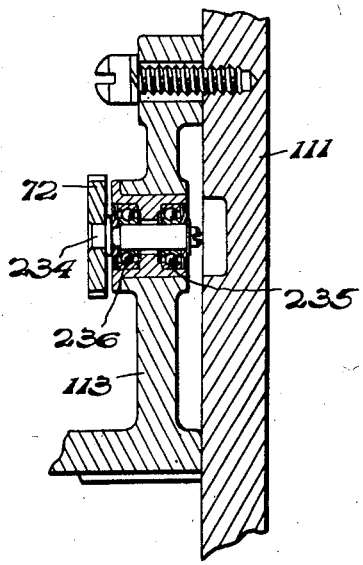
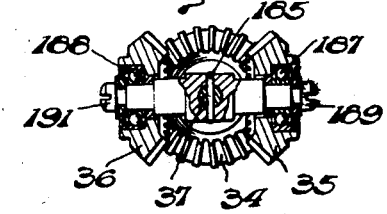
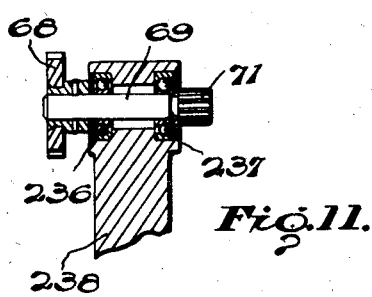
INVENTORS
Morris F. Ketay
BY Joseph R. Miller
Roy D. Bateman
ATTORNEY Jan. 3, 1950 M. F. KETAY ET AL 2,493,585
ELECTRICAL FOLLOW-UP SYSTEM
Filed April 27, 1944 10 Sheets-Sheet 8

INVENTORS
Morris F. Ketay
BY Joseph R. Miller

Roy D. Bateman
ATTORNEY

Jan. 3, 1950     M. F. KETAY ET AL     2,493,585
ELECTRICAL FOLLOW-UP SYSTEM
Filed April 27, 1944     10 Sheets-Sheet 10
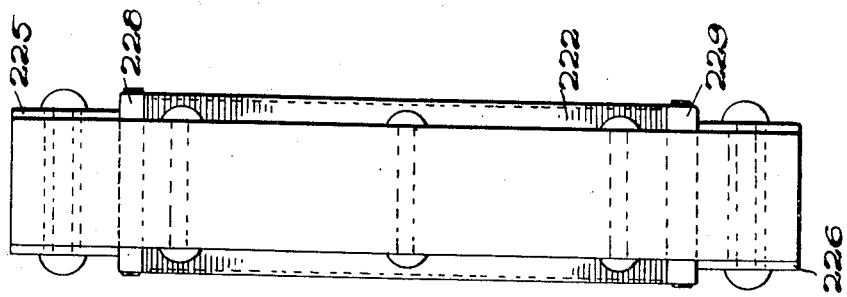
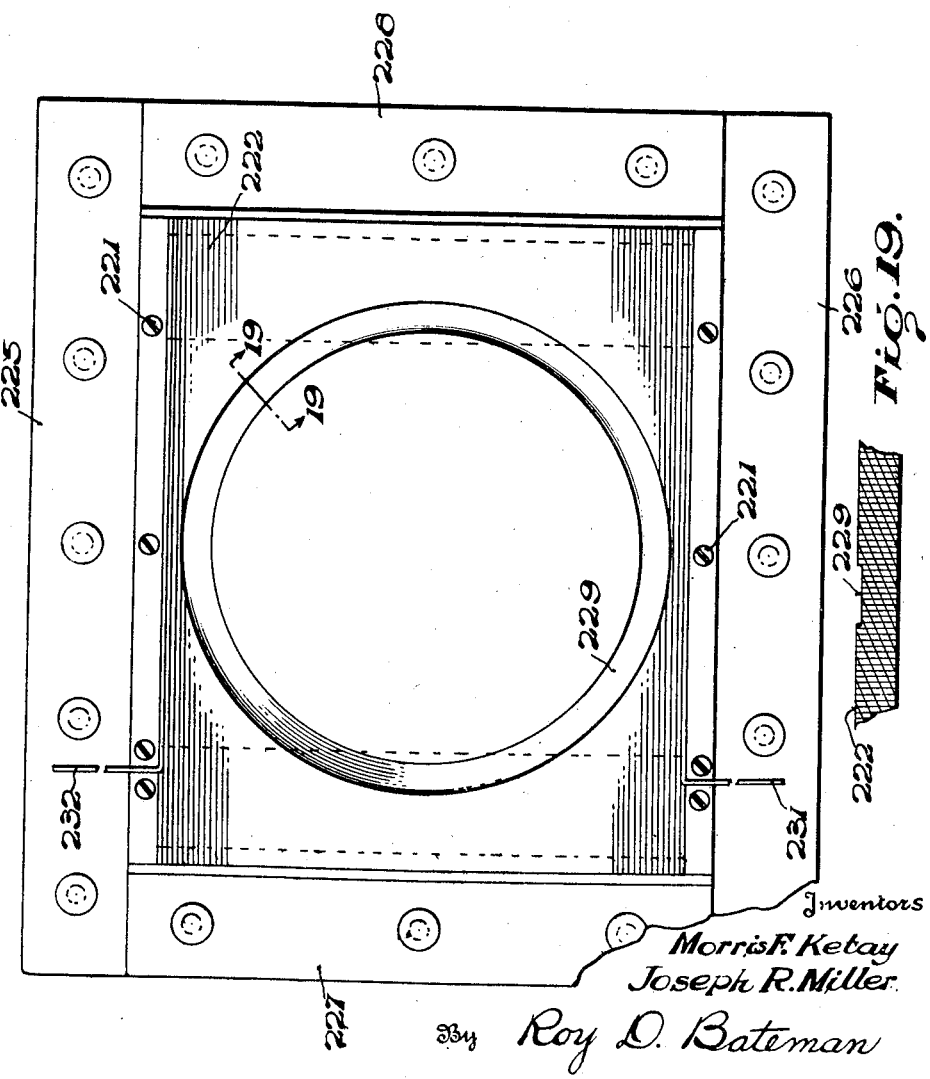
Inventors
Morris F. Ketay
Joseph R. Miller
By Roy D. Bateman
Attorney Patented Jan. 3, 1950

2,493,585

UNITED STATES PATENT OFFICE 2,493,585

ELECTRICAL FOLLOW-UP SYSTEM

Morris F. Ketay, Brooklyn, and Joseph R. Miller, Forest Hills, N. Y., assignors to Bendix Aviation Corporation, Brooklyn, N. Y., a corporation of Delaware Application April 27, 1944, Serial No. 533,016

5 Claims. (Cl. 318—30)

The present invention relates to electrical apparatus, more particularly to apparatus of the type in which angular movements applied to the rotor of a self-synchronous transmitter motor are electrically transmitted to a second self-synchronous follower or receiver motor, whose rotor is caused to accurately follow the transmitter rotor.

While this combination has proven to be successful in applications in which the follower motor is called upon to handle torque of relatively small magnitudes, it has been found that when any appreciable amounts of torque are to be transmitted, especially when the load is variable, the repeater motor will not accurately follow the signal, but will lag by an angle proportional to the torque. For these reasons it has been heretofore impracticable to employ a self-synchronous motor assembly to transmit large amounts of power, as for instance which would be required to operate a fuse setter or to rotate structures involving relatively great inertia forces.

Devices have been heretofore proposed embodying a follow-up head and an induction motor, but they have not proved altogether successful because they do not provide the degree of accuracy of following desired, and are also open to the objection that they oscillate or hunt badly.

We have found that by driving a commutator type transmitter by means of a planetary mechanism of the differential type, and applying power to one element of the planetary mechanism by means of a motor which is automatically driven in a direction to compensate for lagging or leading of the power motor with respect to the signal, and applying power to the other input element of the planetary mechanism by means of a constantly driven variable speed drive device, and varying the speed ratio of the latter by means of a second motor, which is automatically driven in a direction to compensate for leading or lagging of the power motor with respect to the signal, a device is achieved which will so supply electrical energy to a power motor as to cause it to accurately follow the signal at all times, without manifesting appreciable tendencies to oscillate or hunt under varying speed and load conditions.

It is accordingly the primary object of this invention to provide a novel electro-mechanical device which will take the output signal from a self-synchronous motor or the like, and supply power to a driving motor in such manner as to cause it to precisely follow the signal, without manifesting any appreciable tendencies to hunt or oscillate, irrespective of the speed of rotation, or the magnitude of the load imposed upon the driving motor.

Another important object is to provide a novel electro-mechanical system in which the driving motor is powered by means of a transmitter which is rotated at a speed exactly proportional to the algebraic sum of the speeds of a compensating motor and a variable speed mechanism, and wherein the speed and direction of the latter, and the direction of rotation of the compensating motor, are automatically controlled in accordance with the lead or lag of the driving motor with respect to the signal, to insure synchronous following at all times.

Another object is to provide an electromechanical device embodying a planetary mechanism, with a motor which is operable to selectively rotate one element of the planetary mechanism in either direction, and is also operable to exert substantial braking torque upon the element when it is not applying rotative effort thereto.

A further object is to provide a novel follow-up head assembly which is operable to automatically close one or the other of two circuits in accordance with whether the driving motor is leading or lagging the transmitted signal, and which is operable to close both circuits when the driving motor is in synchronism with the signal.

Another object is to provide an electrical apparatus with a control mechanism embodying a planetary mechanism having an output shaft driving a transmitter device and a pair of input elements, one of which is constantly driven from a variable speed device and the other is driven by a motor, and the latter and a second motor controlling the variable speed device are automatically simultaneously energized when the driving motor is leading or lagging the signal, the parts being so designed that energization of the motors of minor duration will be operable to increase or decrease the transmitter speed, but will be inoperable to vary the speed ratio of the variable speed device, except under certain conditions.

A further object is to provide a variable output autotransformer of novel construction, having a brush assembly operable to take off output voltages which are directly proportional to the secondary voltages of a self-synchronous motor, whereby they may be utilized to drive a follower motor in exact synchronism with the brush assembly.

The invention further aims to provide, for use in electro-mechanical apparatus, a novel follow-up head structure, improved variable speed drive and planetary mechanisms, and further improvements and refinements to be hereinafter pointed out.

Further objects will become apparent as the specification proceeds in conjunction with the annexed drawings, and from the appended claims.

In the drawings,

Fig. 7 is a fragmental sectional view taken on line 7—7 of Fig. 3.

Fig. 8 is a fragmental sectional view taken on the line 8—8 of Fig. 3.

Fig. 11 is a sectional view of the reduction gearing between one of the compensating motors and the planetary system, taken on line 11—11 of Fig. 3.

Fig. 13 is a sectional view of the planetary drive, taken on line 13—13 of Fig. 6.

Fig. 17 is a front elevational view of the commutator transmitter of the invention.

Fig. 18 is an end elevational view of the transmitter of Fig. 17, and

Fig. 19 is a fragmental sectional view, on an enlarged scale, taken on line 19—19 of Fig. 17.

Figure 1:
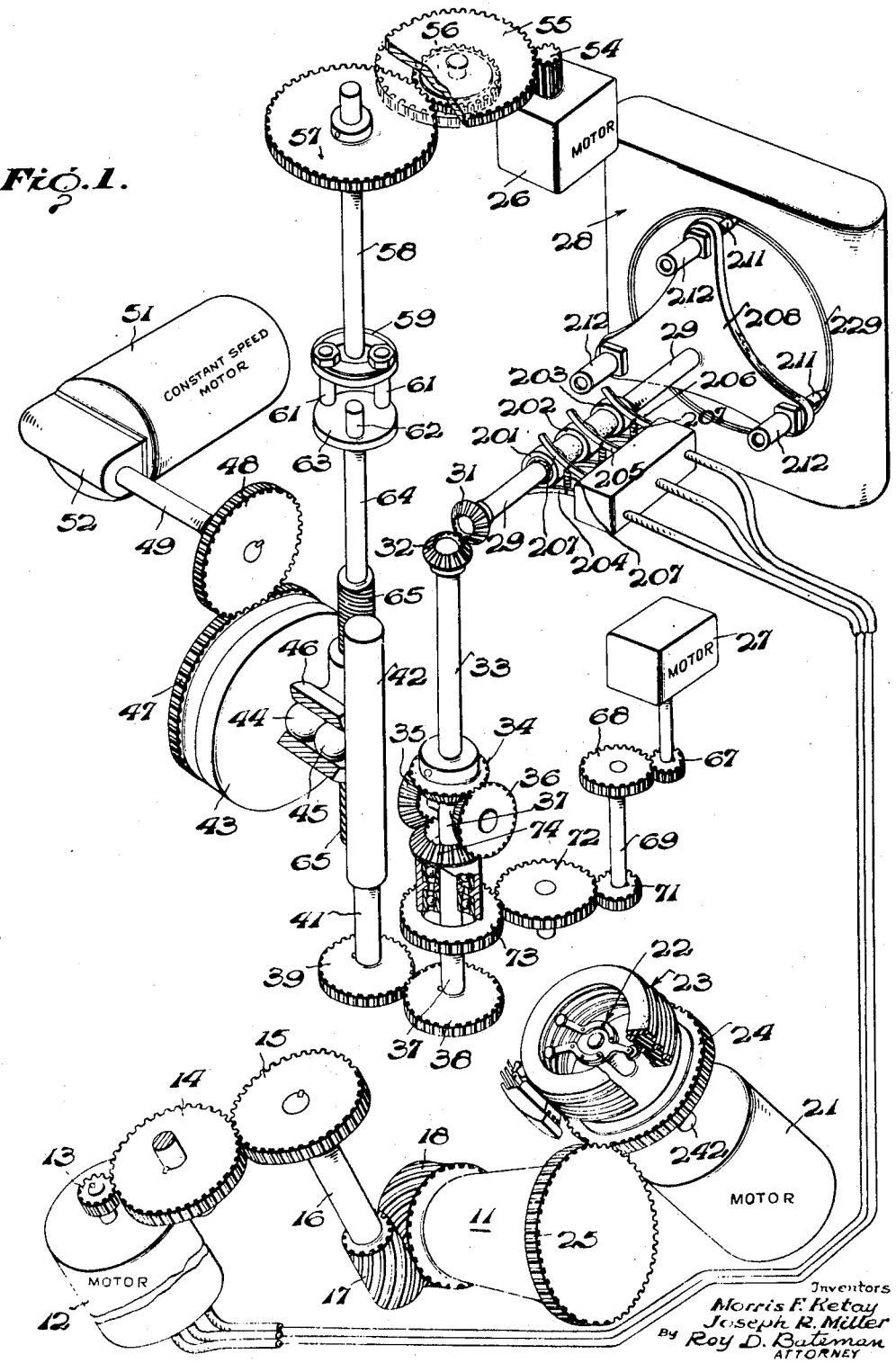
Fig. 1 is a diagrammatic perspective view of an electrical apparatus embodying the invention, various bearings being omitted and other parts being shown in simplified form to clarify the disclosure.

With continued reference to the drawings, in which like reference characters have been employed to designate similar parts throughout the several views, and referring first to Fig. 1, which illustrates the entire apparatus of the invention in schematic form, the invention has been illustrated as applied to a fuse setter having a rotatable member 11, but it is to be understood that the invention is not limited to such use, and may be successfully employed in various types of apparatus in which an accurate following action is desired.

The fuse setter is driven by a motor 12, through suitable reduction gearing comprising a spur pinion 13, which meshes with an idler gear 14, driving a gear 15 carried by a shaft 16. The latter carries a worm 17 meshing with a worm gear 18 on the fuse setter.

The incoming signal is received from a self-synchronous transmitter motor 19 (Fig. 2) by a self-synchronous receiver motor 21. The driving motor is caused to accurately follow or track with respect to motor 21 by means of the novel mechanism that will now be described. The shaft of motor 21 carries a contact assembly 22 which cooperates with a combined slip ring and commutator assembly 23, the two assemblies constituting a follow-up head. Commutator 23 is rotated by means of a gear 24 which meshes with a drive gear 25 carried by the fuse setter.

The follow-up head is operable to simultaneously effect rotation of a pair of compensating motors 26 and 27 in one direction when driving motor 12 is leading with respect to motor 21, and to effect opposite rotation when the driving motor is lagging with respect to motor 21. This action of the compensating motors is utilized to automatically bring the driving motor into synchronism as follows.

The rotor or secondary of motor 12 is energized by means of a commutator transmitter 28 having a brush carrying shaft 29, the parts being so designed that motor 12 will rotate at the same speed as brush shaft 29. The latter is driven by means of a bevel gear 31 meshing with a bevel gear 32 carried by a shaft 33. Shaft 33 is driven by a planetary mechanism at a speed which is the algebraic sum of the speeds of two input elements of the system which are under the control of the speed as brush shafts 29. The latter is driven by nism shown is of the well-known "differential" bevel gear form, but it is to be understood that other types of planetary mechanisms, such as spur gear types providing the desired differential action may be employed without departing from the spirit of the invention.

Shaft 33 carries a gear 34 which meshes with a pair of differential spider gears 35 and 36 carried by a shaft 37. The latter carries a gear 38 which meshes with a similar gear 39 carried by a shaft 41, which is provided with a roller 42. Mounted for rotation about a fixed axis, disposed normal to roller 42, is a disc 43. Power is transmitted therebetween by means of a pair of frictional driving balls 44 and 45 disposed side-by-side in a carrier 46, the balls being disposed between the parts under sufficient driving pressure to transmit power without excessive slippage, it being understood that when the balls are in the position illustrated in Fig. 1, at the center of the disc, no motion will be transmitted from the disc to the roller.

The disc may be rotated in any suitable manner, as for instance by means of a gear 47 secured to the disc and meshing with a gear 48 carried by the shaft 49 of a motor 51, having a built in gear reduction unit 52. While any suitable speed of rotation may be employed, we have found that very successful results are achieved by giving the disc a constant rotative speed of 100 R. P. M.

The position of the driving balls with respect to the disc center is automatically controlled by compensating motor 26 in the following manner:

Motor 26 drives a spur pinion 54 meshing with a spur gear 55 carrying a smaller gear 56 which in turn meshes with a spur gear 57 carried by shaft 58. The latter carries a slotted flange 59 provided with a pair of adjustable drive lugs 61. Cooperating with driving lugs 61 is a driven lug 62 carried by a flange 63 of a shaft 64. The purpose of providing a predetermined degree of lost-motion between shafts 58 and 64 is to prevent oscillation or hunting of the mechanism, in the manner to be hereinafter described in detail.

Shaft 64 terminates in a screw 65 which is threaded into carrier 46. From the foregoing, it is apparent that by energizing motor 26 to rotate shafts 58 and 64 one direction or the other, carrier 46 may be traversed across the face of the disc, with the result that as the balls are moved outwardly from the center of the disc, a speed of roller rotation is produced which is proportional to the distance which the balls have been moved from the disc center. If the balls are moved from the center of the disc in the opposite direction, rotation of the roller is reversed, but the speed is still proportional to the distance from the disc center. By this combination of parts a reversible, variable speed drive mechanism is achieved which is properly controllable to supply the limited amount of torque necessary to secure the desired rotation of shaft 29 in accordance with the invention. However, it is to be understood that the invention is not limited to the specific friction type of variable speed drive disclosed, as other suitable forms may be used.

Motor 27 is also employed to vary the speed of the commutator transmitter as follows:

The shaft of motor 27 carries a spur pinion 67 meshing with a spur gear 68 carried by a shaft 69. A spur pinion 71 on shaft 69 meshes with an idler spur gear 72 which in turn meshes with a gear 73 journalled for free rotation with respect to shaft 37 and is rigidly connected to a bevel gear 74 which meshes with spider gears 35 and 36.

From the foregoing disclosure it is apparent that motor 26 is operative to vary the power supplied the system from motor 51, and motor 27 is operative to add or subtract a speed increment from the system.

Figure 2:
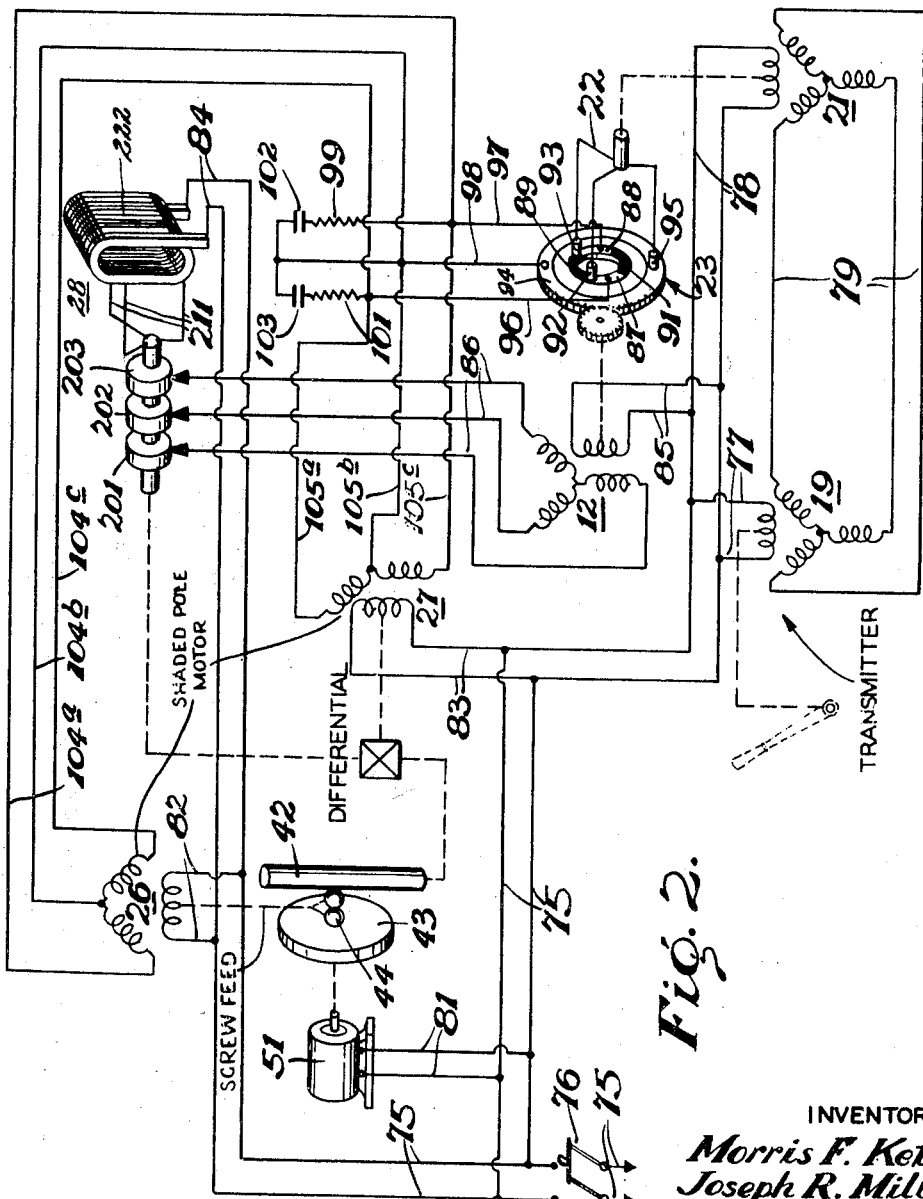
Fig. 2 is a schematic wiring diagram of the entire system showing also the mechanical linkage of the units.

The parts are electrically connected as shown in Fig. 2 to carry out the invention. With continued reference to this figure, alternating current of any suitable frequency is supplied by mains 75, the circuit being controlled by any suitable form of switch 76. Current is supplied to the rotors of self-synchronous motors 19 and 21 by means of leads 77 and 78 respectively, it being understood that rotation of the rotor of motor 19 through a predetermined angle will set up field voltages which, when transmitted to the field of motor 21 through leads 79, will produce an exactly similar rotation of the rotor of motor 21. When switch 76 is closed, the A. C. mains also constantly energize motor 51 by way of leads 81; the main fields of motors 26 and 27 by way of leads 82 and 83 respectively; the coil of transmitter 28 by way of leads 84; and the field of driving motor 12 by way of leads 85.

Motor 51 is preferably of the 110 volt A. C. 60 cycle capacitator type, with a built-in speed reduction gearing affording a 12-to-1 reduction, providing a shaft output speed of 150 R. P. M., gears 47 and 48 further reducing the speed of disc 43 to 100 R. P. M.

Motors 26 and 27 are preferably of identical construction and continuous duty, shaded pole induction motors, rated at 115 volts; 60 cycles A. C. and 1800 R. P. M., have been chosen for illustration.

Motor 12 is a large self-synchronous repeater motor employed as a power motor and connected to the commutator transmitter by way of leads 86.

The follow up head embodies a pair of conductive segments 87 and 88, which are insulated from each other by insulator segments 89 and 91. The contacter includes a pair of spaced rollers 92 and 93, which are spaced apart a distance just sufficient to bridge insulator segment 89, so that in the position shown in Fig. 2 both segments 87 and 88 are electrically connected to a slip ring 94 by means of contact roller 95.

Through suitable slip ring assemblies to be hereinafter described, segments 87, 88, and slip ring 94 are connected to lines 96, 97, and 98 respectively. These lines lead to the shaded pole fields of motors 26 and 27. As shown in Fig. 2, resistors 99, and 101 and condensers 102 and 103 are incorporated in the lines to serve as a quench, in well known manner. Motors 26 and 27 are of the well known shaded pole type, constructed with two shading coils so wound that a low voltage is induced in each one by the primary winding. When one of the shading coils is short circuited, the motor rotates in one direction. When the other one is short circuited the motor rotates in the other direction. When both coils are short circuited an appreciable braking action is produced resisting rotation of the motor shafts. If the motor is in motion, short circuiting both coils tends to bring the armature to rest very quickly. If the motor is at rest, it exerts an appreciable force opposing the rotation in either direction.

As seen in Fig. 2, the two shading coils of motor 26 are provided with leads 104a, 104b, and 104c, it being observed that when the contact roller assembly engages segment 88 a circuit is closed through lines 104a and 104b, short circuiting that coil, and that when contact is made with segment 87, the other coil is short circuited through leads 104b and 104c.

Motor 27 is provided with similar leads 105a, 105b and 105c, which are adapted to short circuit the coils of that motor in similar manner, it being understood that when the contact roller assembly is in the position shown in Fig. 2 both coils of each motor will be short circuited, whereby they will both exert an electrical braking action upon their armatures.

Taking up the operation of the device so far described, the incoming signal rotates the shaft of motor 21, causing the contact roller assembly to make contact with one or the other of segments 87 and 88. This completes one or the other shading coil circuit of compensating motors 26 and 27.

If in the event that when the motors are energized balls 44 and 45 are initially in the center of the disc (as shown in Fig. 1), no rotation of roller 42 will result. However, as soon as motor 26 is energized, shaft 64 and screw 65 are rotated so as to move the balls away from the center of the disc in a direction determined by the particular segment 87 or 88 with which the contact roller is in engagement. If the balls are moved off the center in one direction, clockwise rotation of the shaft 41 results, and if moved in the opposite direction counter-clockwise rotation is obtained. Because the disc is rotated at constant speed by motor 51, the distance of the balls from the center of the disc determines the speed of the roller.

When motor 26 is energized as just described, and the balls are moved outwardly of the disc center, the resulting rotation of shaft 41 through gears 38 and 39 would produce idle planetation of spider gears 35 and 36 and reverse rotation gear 74, if it were not for the resistance to rotation of gear 74 imposed by the gear train leading to motor 27. However, when motors 26 and 27 are energized as just described, motor 27 rotates in such direction as to produce a direction of rotation of gear 74 which will add to or subtract from the speed of rotation of shaft 37 produced by the variable speed drive mechanism. In other words, the planetary mechanism embodies a single output shaft 33 leading to the commutator transmitter, and a pair of input elements made up of shaft 37 and gear 74, with the result that shaft 33 will be rotated at a speed which is the algebraic sum of the speeds of gear 74 and shaft 37.

Assuming that the compensating motors have been energized as the result of the power motor lagging signal receiving motor 21, and are supplying power to the input elements of the planetary mechanism, and that shaft 33 is driving the commutator transmitter at a predetermined speed, power motor 12 connected to the latter will be driven at exactly the same speed. Rotation of the power motor 12, through the interposed gearing, rotates the slip ring assembly 23, with the result that as soon as the parts have been brought into synchronism through the compensating actions of motors 26, 27, and 51 in the manner just described, the contact assembly will be restored to the position shown in Fig. 2, in which both the shaded pole coils of motors 26 and 27 are short circuited, whereby they exert resistance to further rotation of their armatures. This locks the ball carrier in a predetermined position, locating the balls a fixed distance from the axis of disc 43. The driving action of motor 51, through the disc and ball assembly, continues to drive the commutator at the proper following speed and the reactive torque imposed by the load upon gear 74, through the interposed gear train, results in the armature of the motor 27 being driven mechanically at low speed against the resistance of electrical braking action set up by the short circuiting of its shading coils. This reverse rotation of motor 27 sets up a highly desirable cushioning action, which tends to "iron out" minor speed variations.

With the power motor accurately following the receiving motor 21 in the manner just described, in the event that a minor variation in the speed occurs, such as to momentarily cause roller 92 or roller 93 to make contact with segments 87 or 88, motors 26 and 27 will be momentarily energized and the circuit then broken. This results in motor 27 adding to, or subtracting a speed increment from the speed of shaft 33 sufficient to bring the commutator transmitter into synchronism with the signal. During the foregoing momentary energization of motor 26, shaft 58 is rotated a small angular distance due to the reduction gearing between it and the motor, and if the travel is insufficient to close the lost-motion between driving lugs 61 and driven lug 62 before the contactor is restored to the position of Fig. 2, no rotation of screw 65, and hence no change in the position of the balls with respect to the center of the disc will occur.

This is highly desirable to proper functioning of the mechanism inasmuch as there are many instances during normal operation in which only a very minor speed compensation is required, and it is essential to have this difference made up by motor 27, without changing the distance of the balls from the disc axis. Otherwise, if no lost-motion were provided between shafts 58 and 64, the ball radius would be varied minor amounts in response to each circuit closing and this would necessitate further compensatory actions, which would set up hunting tendencies in the system. For instance, if the driving motor lagged the signal by a minor amount, and the ball radius were changed to compensate for the lag, it is very likely that the new ball position would result in the driving motor ultimately being rotated at a speed in excess of the proper tracking speed upon opening of the circuit. Accordingly, the contact would engage the other segment and the circuit would then close and motor 26 would operate to reduce the ball radius. In this way the mechanism would manifest an oscillating or hunting action, constantly deviating from the desired tracking speed, by alternately exceeding it and then falling below it, rather than correctly following it.

From the foregoing disclosure, it is apparent that after substantially steady operation of the mechanism is reached after starting, the balls will automatically find a radius at which they will transmit the power from constantly operating motor 51 through the planetary mechanism and drive the transmitter 28 at a speed substantially equal to the tracking speed, with motors 26 and 27 deenergized, minor departures of motor 12 from the speed of motor 21 being compensated for by motor 27, whereas in the event that a large difference in speed occurs, the parts will be brought into synchronism by the combined actions of motor 26 and 27, the former moving the ball carrier into a new position with respect to the disc center, and the latter adding or subtracting a speed increment from the commutator speed. Motor 12 and driven element 11 are accordingly driven exactly in accordance with the signal input to motor 21.

Figure 3:
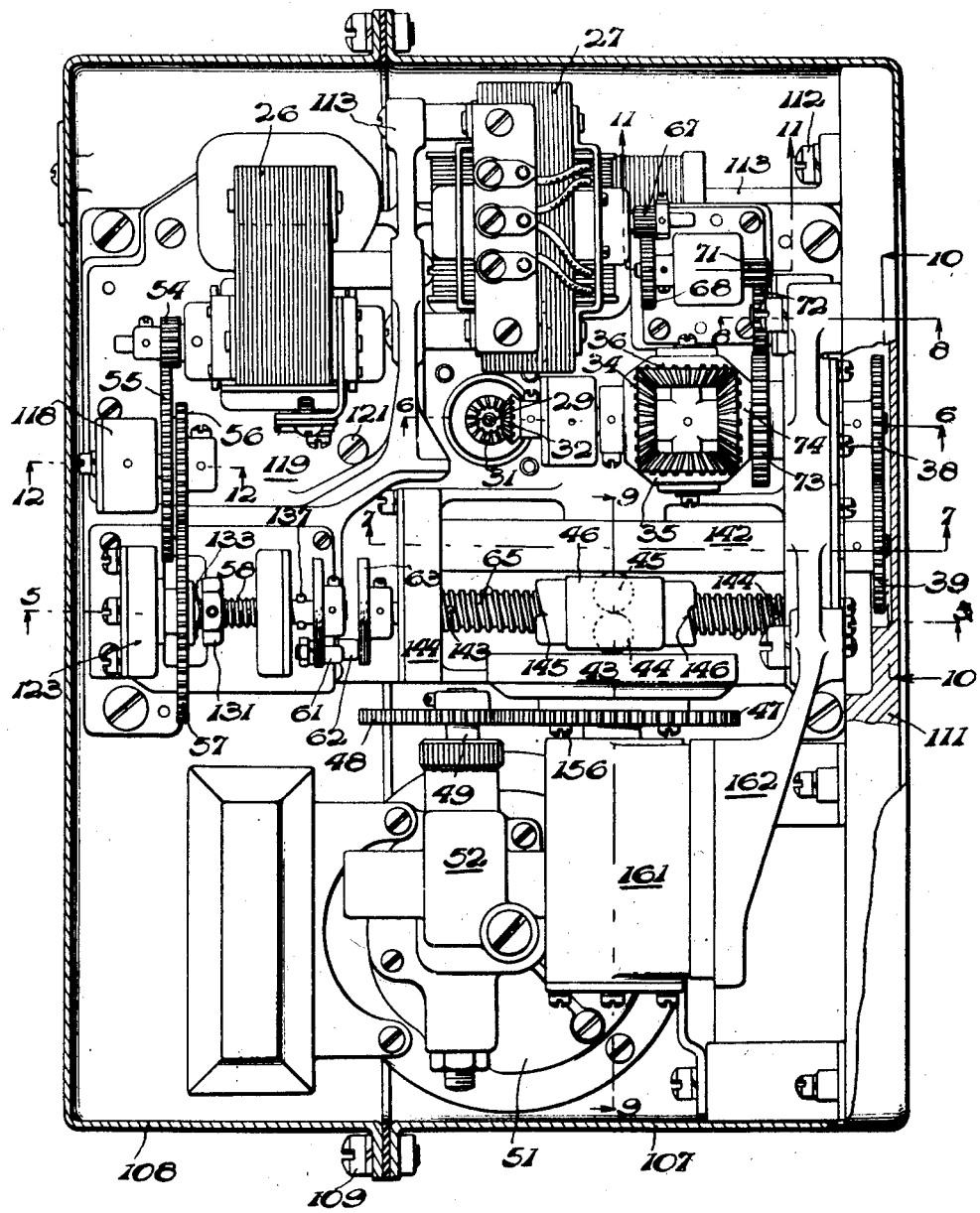
Fig. 3 is a side elevational view of the apparatus of the invention, the casing and a portion of the base plate being broken away to illustrate the parts.
Figure 4:
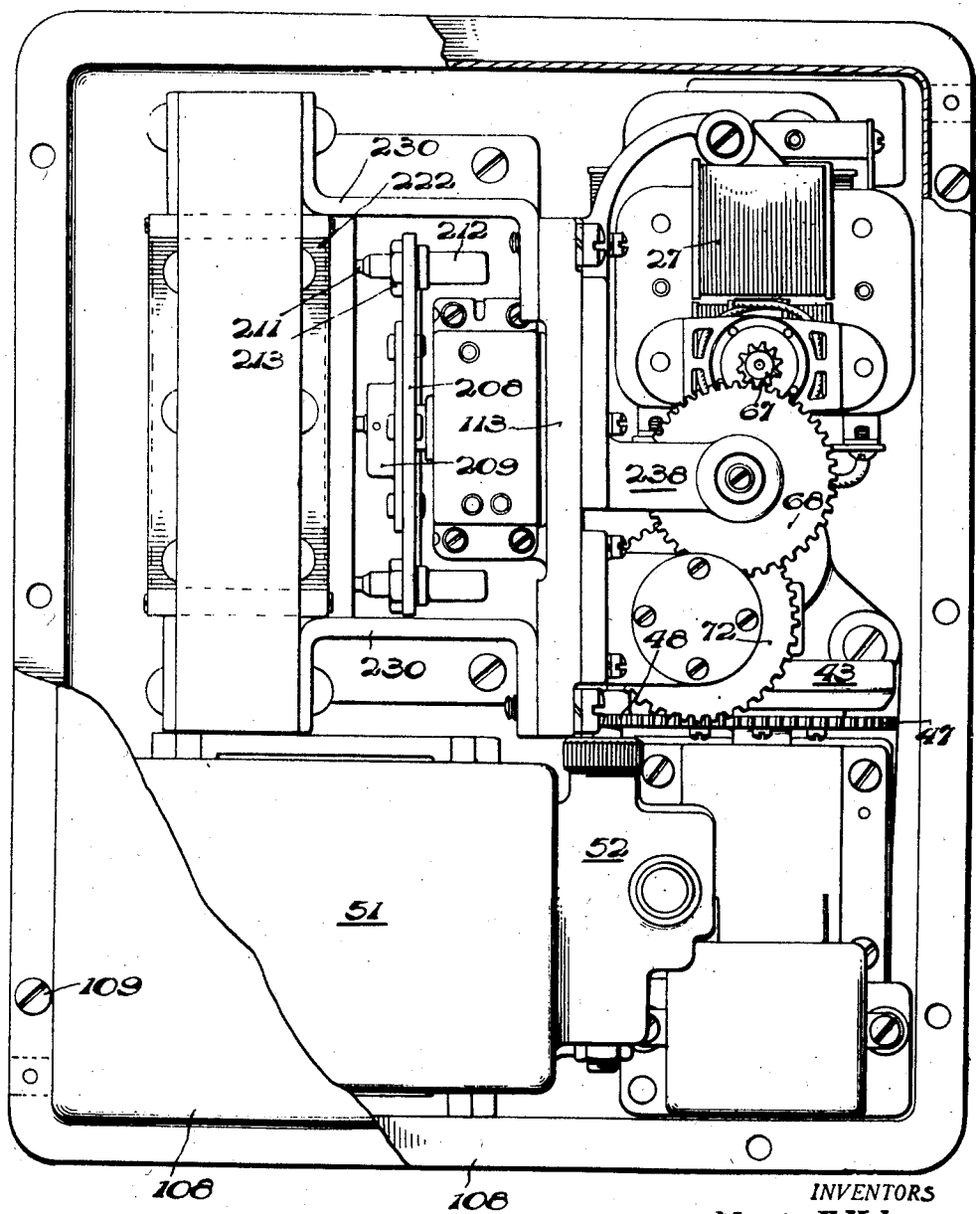
Fig. 4 is a front elevational view of the apparatus, the cover of the casing being broken away to illustrate the interior.

Taking up the disclosure of the detailed structure for carrying out the invention, and referring particularly to Figs. 3 and 4, the mechanism is enclosed within a housing 107 having a cover section 108 secured thereto by screws 109. A mounting or foundation plate 111 is suitably secured within casing section 107 and supports all of the parts of the mechanism. Secured to mounting plate 111, by means of screws 112 or the like, is a framework 113 to which certain parts of the mechanism are secured.

Figure 12:
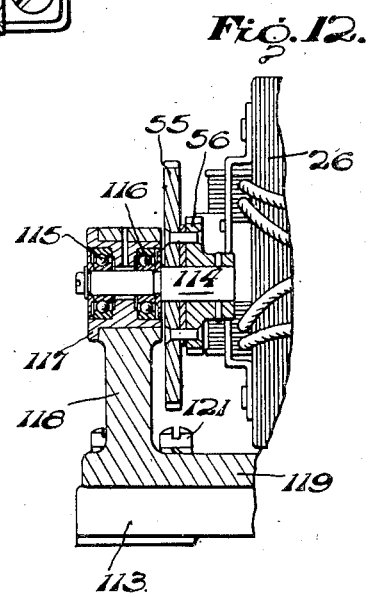
Fig. 12 is a fragmental sectional view of the gearing between one of the compensating motors and the screw of the variable drive mechanism, and is taken on the line 12—12 of Fig. 3.

Motor 26 is suitably secured to the framework in the upper portion of the casing, and as seen in Figs. 3 and 12, intermediate gears 55 and 56 are riveted together and are pinned to a shaft 114 which is journalled in a pair of bearings 115 and 116 carried in a retainer 117 secured in a standard 118. The latter is carried by a plate 119 which is secured to framework 113 by screws 121.

Figure 5:
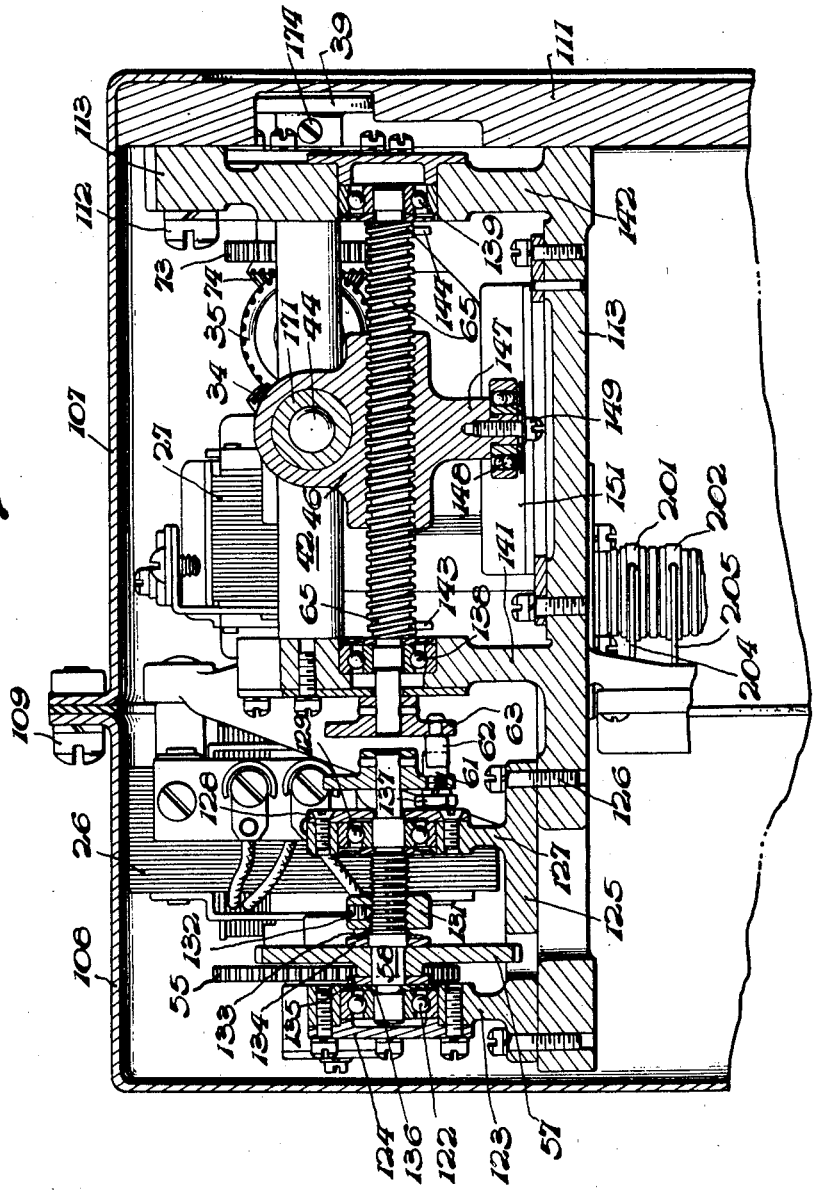
Fig. 5 is a sectional view taken substantially on the line 5—5, looking in the direction of the arrows.

Referring now to Fig. 5, gear 57 is journalled on shaft 58, which is journalled at one end in a ball bearing 122, the latter being retained in an opening in a standard 123 by means of a closure cap 124. Standard 123 is provided on a plate 125 secured to framework 113 by screws 126. Secured in a second pedestal 127 on plate 125, by means of a closure plate 128, is a bearing 129 in which the other end of shaft 58 is journalled. Shaft 58 is provided with a threaded portion on which a nut 131 is adjustably mounted and is adapted to be locked in adjusted position by set screw 132. Nut 131 bears against spring washer 133 which urges a friction washer 134 against the side of gear 57. Bearing against the opposite face of gear 57 is a similar friction washer 135, which in turn is backed up by a closure plate 136 associated with bearing 122.

From the foregoing it is apparent that a yielding driving connection is provided between gear 57 and shaft 58, so that when shaft 58 manifests a predetermined resistance to rotation, gear 57 will merely rotate thereon, under the slipping grip of washers 134 and 135. This prevents damage to the mechanism when the ball carrier reaches the end of its travel in either direction.

As seen in Fig. 5, each driving lug 61 is adjustably secured to flange 59 by means of a nut 137, so that when it is desired to increase or decrease the degree of lost-motion between the parts, it is merely necessary to loosen the nut and move the lug through the desired angle. Screw 65 is journalled in bearings 138 and 139 carried in pedestals 141 and 142 respectively, provided on framework 113. Provided adjacent each end of the screw are stop pins 143 and 144, which coact with notches 145 and 146 provided on ball carrier 46. It should be particularly observed that notches are so designed and located with respect to the relative helical path between them and the carrier that they will squarely abut the bottoms of the notches at either end of travel and will not set up a wedging action. Accordingly, any tendency for the carrier to be locked at either end of travel is avoided.

Rectilinear guided travel of the carriage is provided by means of an arm 147 provided on the carrier, to which the inner race of ball bearing 148 is secured by means of a screw 149. The outer race of the bearing coacts directly with the parallel walls of a channel shaped guideway 151, which is secured to framework 113 by screws 152. This is seen more clearly in Fig. 9.

Figure 9:
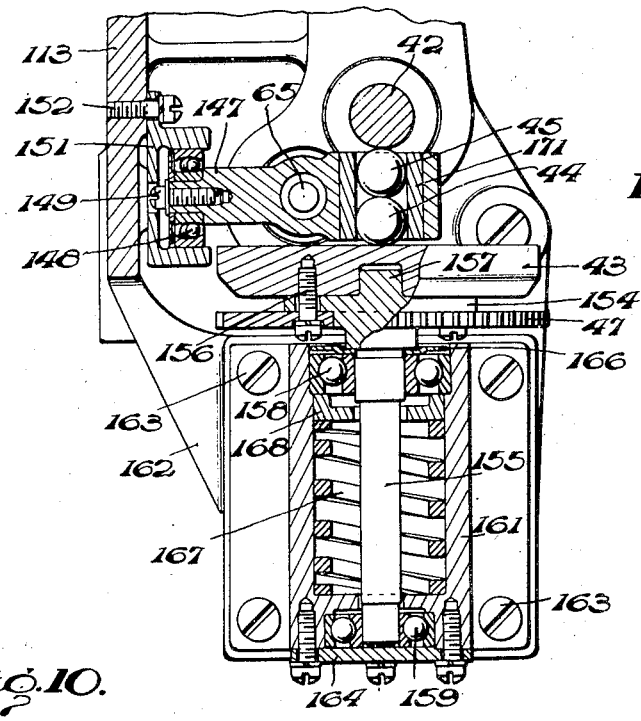
Fig. 9 is a fragmental sectional view of the variable speed drive mechanism, taken on line 9—9 of Fig. 3.

With continued reference to Fig. 9, disc 43 and gear 47 are secured to the opposite sides of a flange 154 of a shaft 155 by means of screws 156, the disc being piloted on the reduced end 157 of the shaft. The disc shaft is journalled in ball bearings 158 and 159 carried by a barrel 161 which is secured to an extension 162 of framework 113 by means of screws 163. Bearing 159 is retained by means of closure plate 164 and the shaft has a sufficiently loose fit within the inner race of bearing 159 so as to be axially slidable with respect thereto. The inner race of bearing 158 engages a dust closure 166 which in turn bears against a shoulder on the shaft.

The outer race of bearing 158 has a sliding fit in barrel 161 and a helical spring 167, reacting against the bottom of the structure and acting against a pressure member 168 which engages the outer race of bearing 158, constantly urges the entire bearing disc and gear assembly towards roller 42, with the result that balls 44 and 45 are placed under the predetermined degree of pressure sufficient to establish a frictional drive between the disc and roller, it being understood that the size and strength of the spring will be selected to exert the requisite driving pressure for the application which is being made of the mechanism. As seen in Fig. 9, the balls are contained within a bushing 171 to reduce wear, and to also make it possible to renew the bushing when it does become worn in use. The drive between the roller and the planetary mechanism will now be described.

Figure 6:
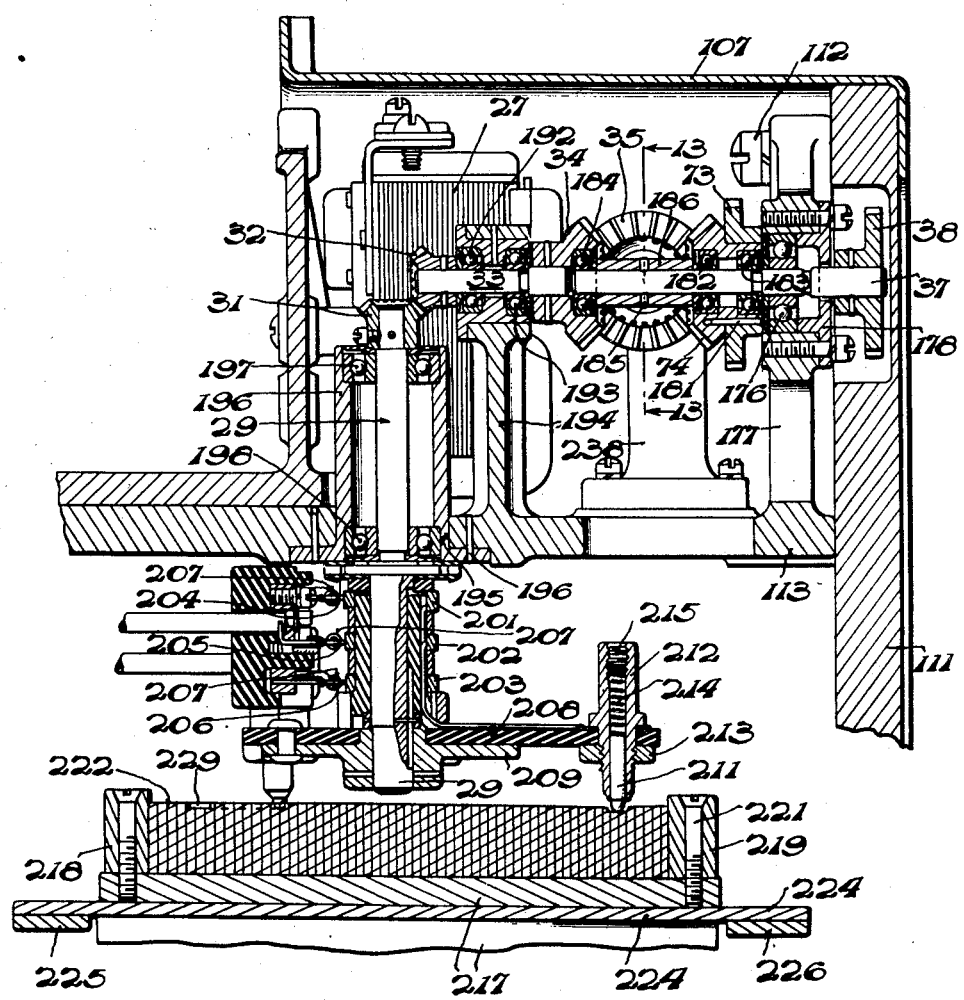
Fig. 6 is a fragmental sectional view taken substantially on the line 6—6 of Fig. 3, as viewed in the direction of the arrows.
Figure 10:
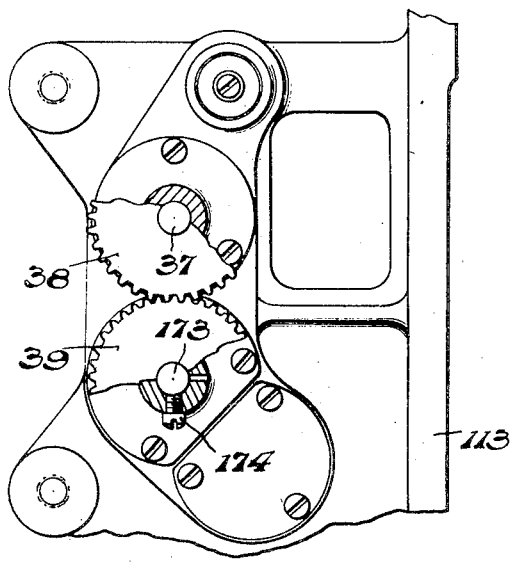
Fig. 10 is an end elevational view of the gearing connection between the frictional roller and the planetary system—the view being taken along the line 10—10 of Fig. 3.

Referring to Figs. 3, 6, and 10, roller 42 is journalled in bearings 170 and 172 carried in pedestals on framework 113 and at one end is provided with a reduced portion 173 to which gear 39 is secured by a set screw 174. Gear 39 meshes with gear 38 carried by shaft 37, which is journalled in a bearing 176 secured in a pedestal 177 of framework 113 by means of a closure cap 178. Spur gear 73 is rigidly secured to the hub of bevel gear 74 by means of dowels 181, and the assembly is journalled on shaft 37 by means of ball bearings 182 and 183. Secured to shaft 37, by means of a pin 185, between bearing 182 and a bearing 184 supporting gear 34 is a differential spider 186 having outwardly directed arms on which spider gears 35 and 36 are journalled. The differential construction is shown more clearly in Fig. 13, it being observed that gears 35 and 36 are carried by ball bearing assemblies 187 and 188, respectively, which are secured on reduced portions of the spider arms by screws 189 and 191.

As seen in Fig. 6, shaft 37 terminates at bearing 184, the latter piloting it within gear 34 carried by shaft 33. The latter is journalled in ball bearing assemblies 192 and 193 supported in a pedestal 194 of framework 113. Tightly secured in an opening 195 in framework 113, by means of dowels 196 and screws (not shown), is a flanged barrel 196, which supports bearings 197 and 198 in which shaft 29 is journalled.

Secured to the projecting end of shaft 29 is a commutator assembly made up of slip rings 201, 202, and 203 with which pairs of brushes or contact fingers 204, 205, and 206 cooperate respectively, each pair of fingers embodying a tension spring 207, which constantly urges them into engagement with the slip rings.

The commutator brush assembly comprises a plate 208 of insulating material secured to the flange of a hub member 209 mounted on the shaft for unitary rotation therewith. Plate 208 has three arms disposed 120° apart and a brush assembly is mounted in each arm. Each brush assembly is made up of a brush proper designated as 211, which is slidably mounted in a barrel 212 secured to the arm by a nut 213. The required brush pressure is exerted by a spring 214 located in barrel 212 and backed up by a set screw 215, which may be adjusted to give the desired brush pressure. The brushes bear against a commutator of novel construction which will now be described.

Referring particularly to Figures 6, 17, 18, and 19, the commutator comprises an insulating core 217 of any suitable dielectic, and is of oval cross section, so as to have two flat sides. The ends of the core are provided with insulating collars 218 and 219 secured in place by screws 221 or the like, and tightly wound on the core between them is a conductor 222 of ribbon-like form. This material is provided with an insulating coating in well-known manner, and is preferably wound upon the core in the edgewise relationship shown, with each convolution disposed in tight engagement with its neighboring turn or convolution. After the coil has been wound and the end pieces are in place, the unit is completed by inserting transformer iron laminations 224 through the coil and joining them at their ends to pieces 225 and 226. As seen in Figs. 17 and 18, the ends of laminations 225 and 226 are rigidly joined to laminations 227 and 228 which complete the magnetic circuit. When the commutator is complete, a groove 229 is accurately cut in one of the flat sides as seen in Figs. 6 and 17, and the bottom of the groove is accurately polished so as to provide a smooth surface upon which the brushes may ride. If desired, a groove may also be cut in the other face of the commutator and a second brush assembly employed to supply voltages to other repeaters.

From the foregoing it is apparent that when the ends 231 and 232 of the ribbon-like coil are connected to a source of alternating current, the assembly constitutes an auto-transformer, and that as the brushes travel around the commutator groove, voltages will be successively generated between adjacent brushes which will be equal to β sine a, where a is the sum of the position angle of the brush plus the angular displacement of the brush assembly. It is noted that these output voltages are identical with the secondary voltages of a standard self-synchronous transmitter. Therefore, when these voltages are impressed upon the rotor coils of motor 12, the latter will rotate in exact synchronism with commutator shaft 29. The transmitter unit may be supported in any suitable manner as for instance by means of a pair of brackets 230 secured to framework 113.

Returning to the other input element of the planetary mechanism, and referring particularly to Figs. 3, 6, 8, and 11, spur gear 73 meshes with idler gear 72 carried by a shaft 234 journalled in bearings 235 and 236 mounted in framework 113. Shaft 69 (Fig. 11) carries spur pinion 71 meshing with idler 72, and is carried in bearings 236 and 237 mounted in a pedestal 238 of framework 113, as seen in Fig. 3, gear 68 meshes with pinion 67 of motor 27, motors 26 and 27 being mounted back-to-back on framework 113. Motor 27 is accordingly, through the interposed gear reduction, operable to rotate gear 74 in either direction and therefore may add a speed increment to or subtract a speed increment from transmitter shaft 29. The follow-up head structure will now be described.

Figure 14:
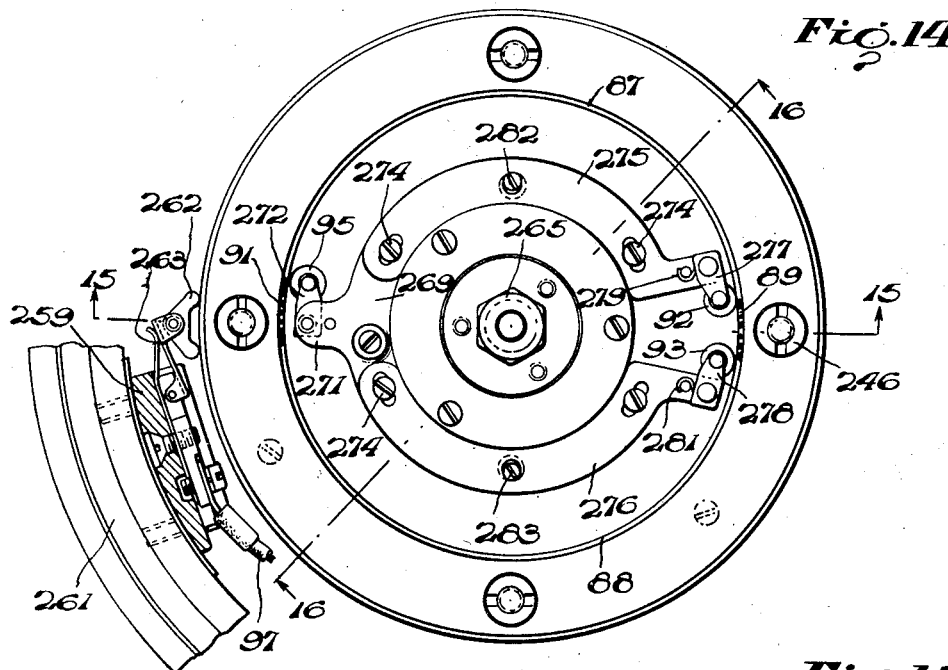
Fig. 14 is an end elevational view of the follow-up head, the brush assembly being shown in section to clarify the disclosure.
Figure 15:
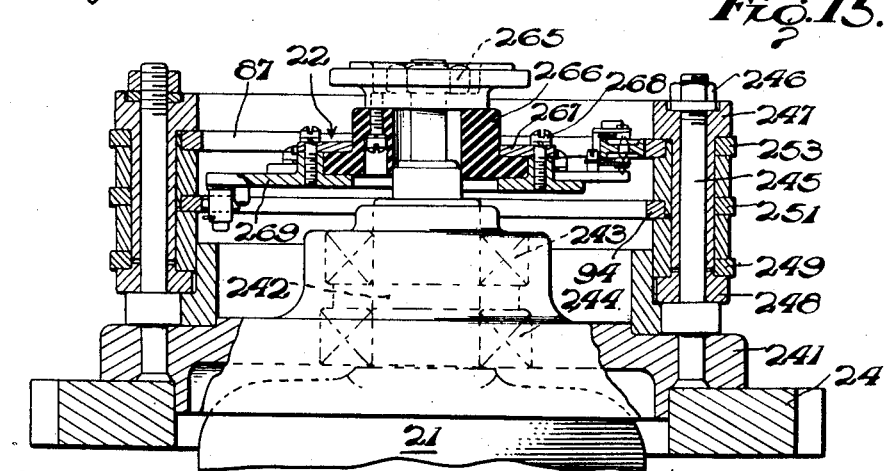
Fig. 15 is a longitudinal sectional view of the follow-up head, taken on line 15—15 of Fig. 14.
Figure 16:
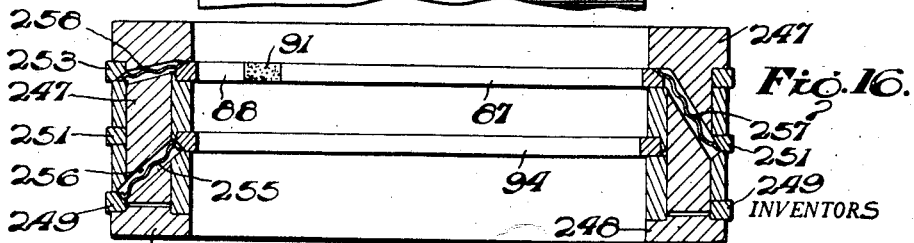
Fig. 16 is a sectional view of the slip-ring assembly of the follow-up head, taken on line 16—16 of Fig. 14.

Referring to Figs. 14, 15, and 16, an adapter 241 is rotatably supported on the shaft 242 of motor 21 by means of a pair of anti-friction bearings 243 and 244. Gear 24 is secured to the adapter in any suitable manner and meshes with gear 25 as seen in Fig. 1. Secured to the adapter, by means of studs 245 and nuts 246, is an insulating sleeve 247 and an insulating ring 248. Fitting around sleeve 247 and spaced apart axially by suitable insulating spacers, are slip rings 249, 251, and 253. Mounted inside of sleeve 247, and spaced apart by suitable insulating rings, is a continuous slip ring 94; live segments 87 and 88; and insulating segments 89 and 91. Referring to Fig. 16, it is observed that external slip ring 249 is electrically connected to internal slip ring 94 by means of a pigtail 255 located in a passage 256 in member 247. In similar manner a pigtail 257 connects slip ring 251 to segment 87, and a pigtail 258 connects slip ring 253 to segment 88.

Any suitable form of brush rigging may be employed to electrically connect lines 96, 97 and 98, to slip rings 249, 251 and 253. As shown in Fig. 14, a block 259 secured to a support 261 pivotally supports brushes 262, which are resiliently urged into engagement with the slip rings by means of springs 263, the end conductor 97 being shown in Fig. 14 as connected to its brush assembly.

Secured to the end of shaft 242 by means of a nut 265 is a flanged insulating member 266, which supports contact assembly 22. Secured to the flange member 266 by means of a plate 267 and screws 268 is a plate 269. The latter has an ear 271 to which an arm 272 is pivoted. Roller 95 is journalled on arm 272 and is constantly urged into engagement with internal slip ring 94 by a spring (not shown). Adjustably mounted on plate 269 by means of screws 274 and two slotted arms 275 and 276, to which arms 277 and 278 are pivotally connected. The latter carry rollers 92 and 93 respectively, and they are urged outwardly into contacting relationship with the segments by springs 279 and 281.

The ends of arms 275 and 276 may be adjusted toward and away from each other by loosening screws 274 and rotating a pair of eccentric headed adjusting screws 282 and 283, which are threaded into plate 269. The proper adjustment is made by spacing the arms so that when the parts are in the position shown in Fig. 14, the rollers just make contact with the ends of segments 87 and 88. We have found that excellent results are obtained when the rollers are so adjusted that rotation of the driving motor from the breaking of contact of one roller with its segment constitutes an angular displacement of from six tenths of a degree to eight tenths of a degree.

From the foregoing disclosure, it is apparent that the input to the follow up head is by way of slip ring 249 through pigtail 255 to internal slip ring 94. The current flows from the latter by way of roller 95, arms 275 and 276, and rollers 92 and 93, to either or both of segments 87 and 88 depending upon whether the power motor 12 is lagging, leading, or is rotating synchronously with signal receiving motor 21.

The invention accordingly provides a novel electro mechanical device embodying a planetary mechanism driven device for controlling operation of the driven motor, and means for supplying power to the planetary mechanism automatically, in accordance with whether the driven motor is leading or lagging the signal, and which insures accurate following at all times, without manifesting appreciable tendencies to oscillate or hunt under varying speed and load conditions, and yet which is of simple, rugged construction.

While we have shown, and prefer to drive a transmitter by means of shaft 29, and to employ a separate motor 12 for producing the following action, it is to be understood that if desired, especially when comparatively small amounts of power are to be transmitted, commutator assembly 23 may be driven by shaft 29, and motor 12 and transmitter 28 may be omitted and the load driven directly by shaft 29, and the appended claims are intended to embrace the invention when it assumes this form. Also, suitable resistance may be inserted in the control circuits of motors 26 and 27 in such manner as to reduce the torque, and consequently the speed and acceleration characteristics of both motors to secure the desired compensating action in the particular application being made of the apparatus of the invention. However, in the particular application of the invention chosen for illustration, we have found that the aforementioned standard motors provide the exact operating characteristics desired, without resorting to resistance or other means for altering their characteristics. It is important to use motors 26 and 27 of substantially identical design, or ones having substantially identical operating characteristics because they have, under those conditions, been found to manifest a highly desirable "balancing" action, and for this reason, if resistance is incorporated in the circuit of one motor for the purpose of modifying its action in a particular application of the invention, a substantially identical resistance should be incorporated in the other motor, to preserve the balancing action between the two motors. Also, we prefer to short circuit both fields of motors 26 and 27 when the follower motor is properly tracking, inasmuch as the electro-magnetic braking so produced makes it possible for the balls to operate at a smaller radius, but it is to be understood that electro-magnetic braking is not essential, and that the invention may be successfully practised by employing motors 26 and 27 which are completely deenergized when the follower motor is correctly tracking with respect to the signal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In an electrical apparatus, a signal receiving motor and a coacting driving motor; a power transmitting mechanism embodying an output member and a pair of input elements; a transmitter device driven by said member to supply power to said driving motor; a control motor driving one of said input elements; a variable speed device driving the other of said input elements; a second control motor to vary the speed ratio of said variable speed device; and circuit making means responsive to the leading or lagging of said driving motor with respect to said signal receiving motor for energizing said control motors to bring said driving motor into synchronism with said receiving motor; said control motors being simultaneously energized and said second control motor being connected to said variable speed device with a coupling embodying a predetermined degree of lost motion, whereby minor energizations of said second control motor will not effect a change in the speed ratio of said variable speed device under certain conditions.

2. In an electrical apparatus, a transmitter motor; a driving motor; coacting contact means driven by said respective motors; a pair of circuits embodying control means, said contacts being adapted to close one circuit when said driving motor is leading with respect to said transmitter motor and to close the other circuit when said driving motor is lagging said transmitter motor, said contacts being adapted to close both of said circuits when said driving motor is accurately following said transmitter motor; said contact means comprising a pair of conductor segments separated by a pair of insulator segments and a pair of collector members adapted to ride on said segments, said collector members being angularly spaced a distance sufficient to bridge one of said insulator segments and engage both of said conductor segments.

3. In an electrical apparatus, a transmitter motor; a driving motor; coacting contact means driven by said respective motors; a pair of circuits embodying control means, said contacts being adapted to close one circuit when said driving motor is leading with respect to said transmitter motor and to close the other circuit when said driving motor is lagging said transmitter motor, said contacts being adapted to close both of said circuits when said driving motor is accurately following said transmitter motor; said control means embodying a pair of shaded-pole induction motors, each of which is provided with a pair of field coils, and one coil of each motor is disposed in one of said circuits and the other coil of each motor is disposed in the other of said circuits, whereby said contact means is operable to selectively short circuit one or the other or both pair of coils.

4. An electrical follow-up system comprising a receiver motor and a driving motor; a commutator driven by said receiver and said driving motors, two reversible control motors connected to said commutator, said commutator being adapted to operate said control motors in one direction when said commutator is in the leading position and in the opposite direction when said commutator is in the lagging position; a differential, one of said control motors forming an input of one side of said differential, a variable speed drive forming the other input of said differential and driven by said second control motor, and a transmitter driven by the output of said differential and electrically connected to said driving motor to operate said motor in synchronism therewith and with said receiver motor.

5. An electrical follow-up system comprising a receiver motor and a driving motor; a commutator driven by said receiver and said driving motors, two reversible control motors connected to said commutator, said commutator being adapted to operate said control motors in one direction when the commutator is in the leading position and in the opposite direction when the commutator is in the lagging position; a differential, one of said control motors forming an input of one side of said differential, a variable speed drive forming the other input of said differential, a lost motion drive connection for said variable speed drive and driven by said second control motor, and a transmitter driven by the output of said differential and electrically connected to said driving motor to operate said motor in synchronism therewith and with said receiver motor.

MORRIS F. KETAY.
JOSEPH R. MILLER.

REFERENCES CITED

The following references are of record in the file of this patent:

UNITED STATES PATENTS

| Number | Name | Date |
|---|---|---|
| 1,693,314 | Murphy | Nov. 27, 1928 |
| 1,958,245 | Mittag et al. | May 8, 1934 |
| 2,009,013 | Karplus et al. | July 23, 1935 |
| 2,071,424 | Papello | Feb. 23, 1937 |
| 2,271,688 | Forster et al. | Feb. 3, 1942 |
| 2,329,216 | Peters | Sept. 14, 1943 |

FOREIGN PATENTS

| Number | Country | Date |
|---|---|---|
| 350,955 | Great Britain | June 11, 1931 |
| 371,517 | Great Britain | Apr. 28, 1932 |